United States Patent
Shor et al.

(10) Patent No.: US 6,950,387 B2
(45) Date of Patent: Sep. 27, 2005

(54) COMMUNICATION METHOD, SYSTEM, AND APPARATUS THAT COMBINES ASPECTS OF CYCLIC PREFIX AND ZERO PADDING TECHNIQUES

(75) Inventors: Gadi Shor, Tel-Aviv (IL); Sorin Goldenberg, Ness-Ziona (IL)

(73) Assignee: Wisair Ltd., Tel-Aviv (IL)

( * ) Notice: Subject to any disclaimer, the term of this patent is extended or adjusted under 35 U.S.C. 154(b) by 119 days.

(21) Appl. No.: 10/645,324

(22) Filed: Aug. 21, 2003

(65) Prior Publication Data

US 2004/0174809 A1 Sep. 9, 2004

Related U.S. Application Data
(60) Provisional application No. 60/450,737, filed on Feb. 28, 2003.

(51) Int. Cl.[7] ................................................ H04J 11/00
(52) U.S. Cl. ........................ 370/206; 370/208; 370/319; 370/480
(58) Field of Search .................................. 370/204, 206, 370/208, 319, 320, 335, 344, 350, 480

(56) References Cited

U.S. PATENT DOCUMENTS

| | | |
|---|---|---|
| 5,177,767 A | 1/1993 | Kato |
| 5,206,881 A | 4/1993 | Messenger et al. |
| 5,218,620 A | 6/1993 | Mori et al. |
| 5,323,419 A | 6/1994 | Mori et al. |
| 5,347,537 A | 9/1994 | Mori et al. |
| 5,677,927 A | 10/1997 | Fullerton et al. |
| 5,960,031 A | 9/1999 | Fullerton et al. |
| 5,963,581 A | 10/1999 | Fullerton et al. |
| 5,995,534 A | 11/1999 | Fullerton et al. |
| 6,002,707 A | 12/1999 | Thue |
| 6,026,125 A | 2/2000 | Larrick, Jr. et al. |
| 6,031,862 A * | 2/2000 | Fullerton et al. ............ 375/146 |
| 6,075,807 A | 6/2000 | Warren et al. |
| 6,111,919 A | 8/2000 | Yonge, III |
| 6,351,652 B1 | 2/2002 | Finn et al. |
| 6,459,679 B1 | 10/2002 | Kim |
| 2003/0218973 A1 * | 11/2003 | Oprea et al. ................. 370/210 |
| 2004/0081131 A1 * | 4/2004 | Walton et al. ............... 370/344 |

FOREIGN PATENT DOCUMENTS

| | | |
|---|---|---|
| EP | 0889 600 AS | 1/1999 |
| JP | 2-137533 | 5/1990 |
| JP | 11-27180 | 1/1999 |
| JP | 11-284599 | 10/1999 |
| JP | 11-313005 | 11/1999 |
| WO | WO01/11814 A1 | 2/2001 |
| WO | WO01/39451 A1 | 5/2001 |
| WO | WO01/93441 A1 | 12/2001 |
| WO | WO01/99300 A2 | 12/2001 |

* cited by examiner

*Primary Examiner*—Afsar Qureshi
(74) *Attorney, Agent, or Firm*—Brown Raysman Millstein Felder & Steiner LLP

(57) ABSTRACT

The present invention provides communication methods, systems, and apparatuses. Methods are provided in which a second signal for transmission is obtained by halving values of an initial portion and a tail portion of a first signal, and adding zeros following the tail portion. Upon or after reception, a third signal is obtained from the received second signal and used in obtaining information. Obtaining each of an initial portion and a tail portion of the third signal includes adding together at least a portion of each of the initial portion and the tail portion of the second signal.

6 Claims, 3 Drawing Sheets

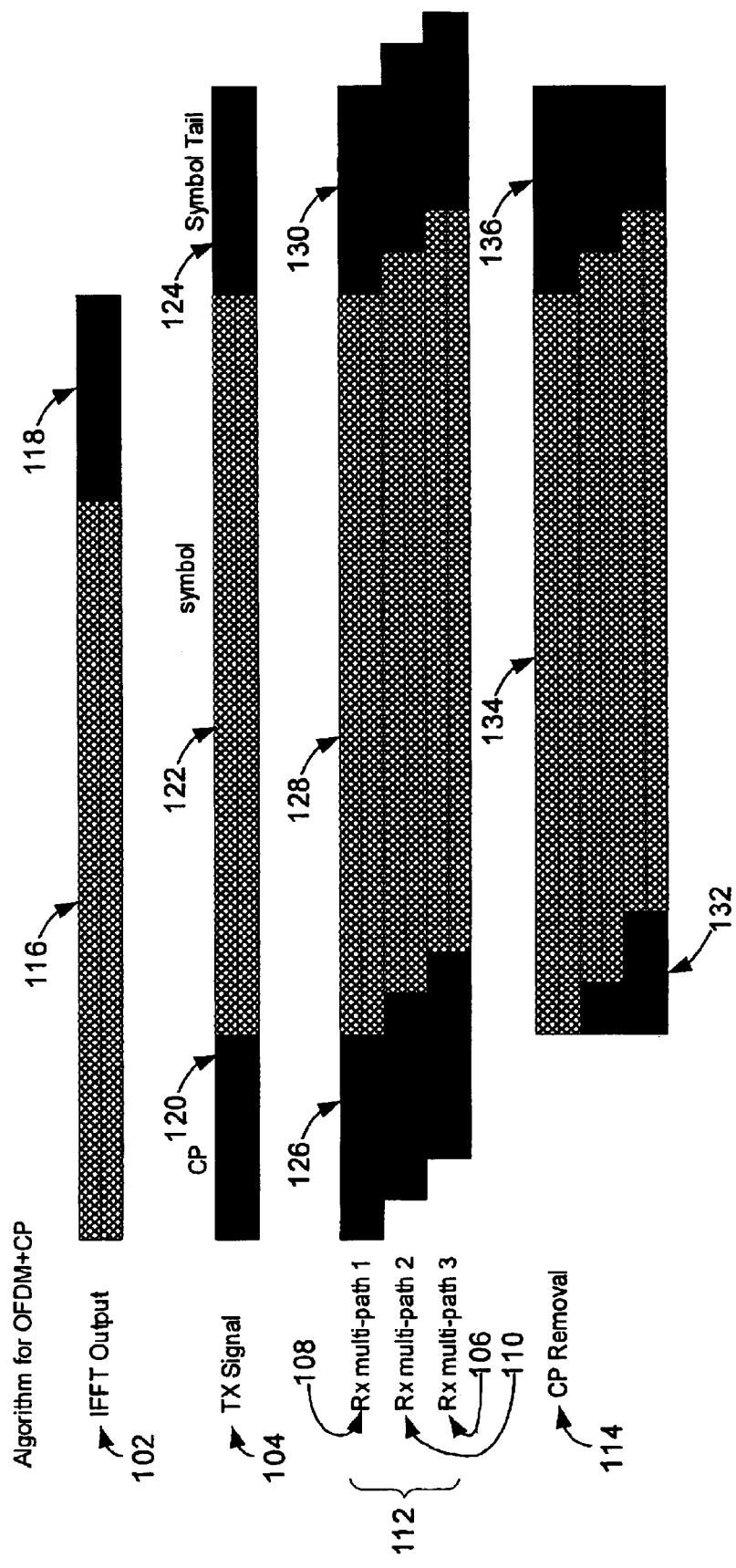

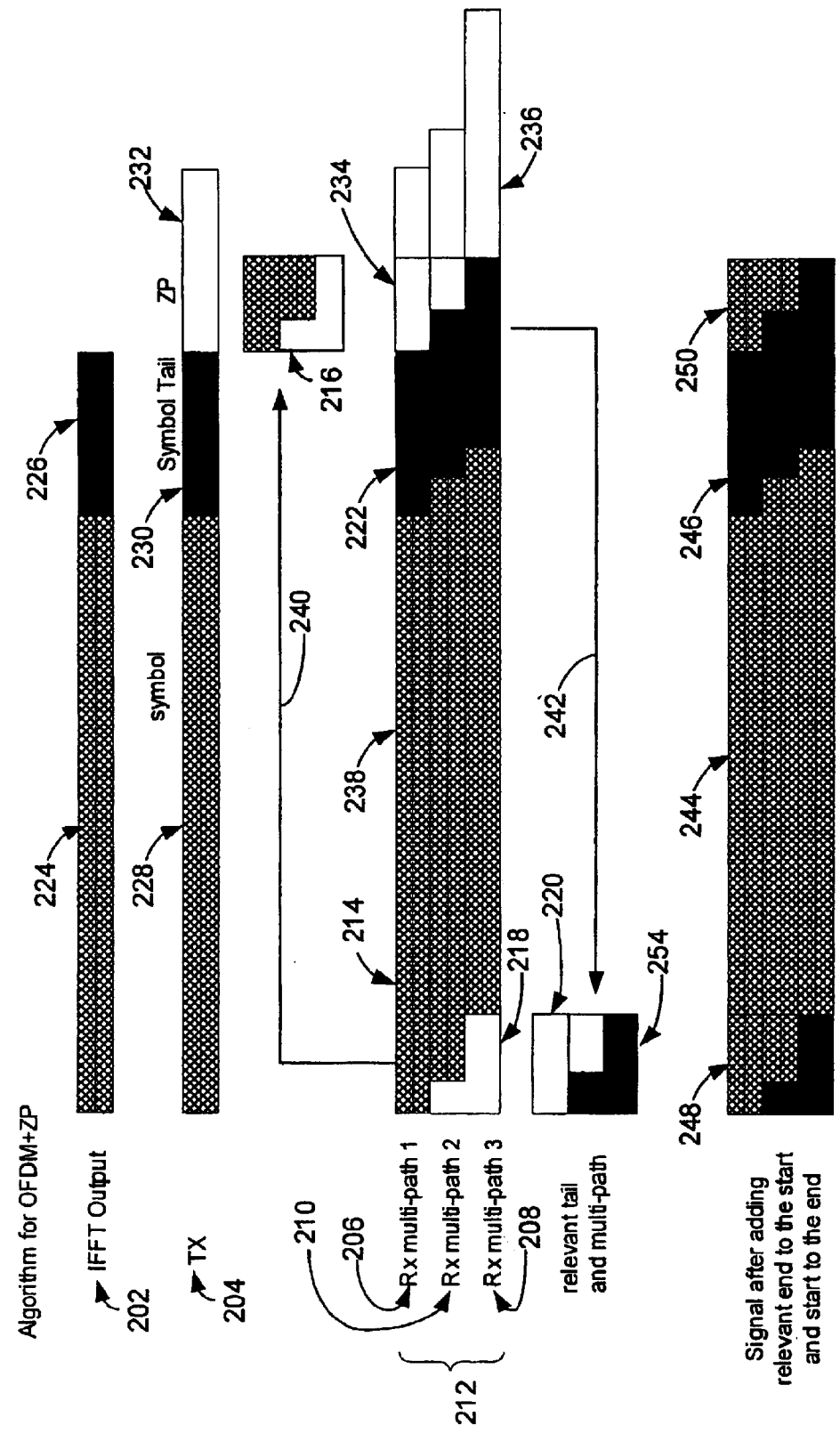

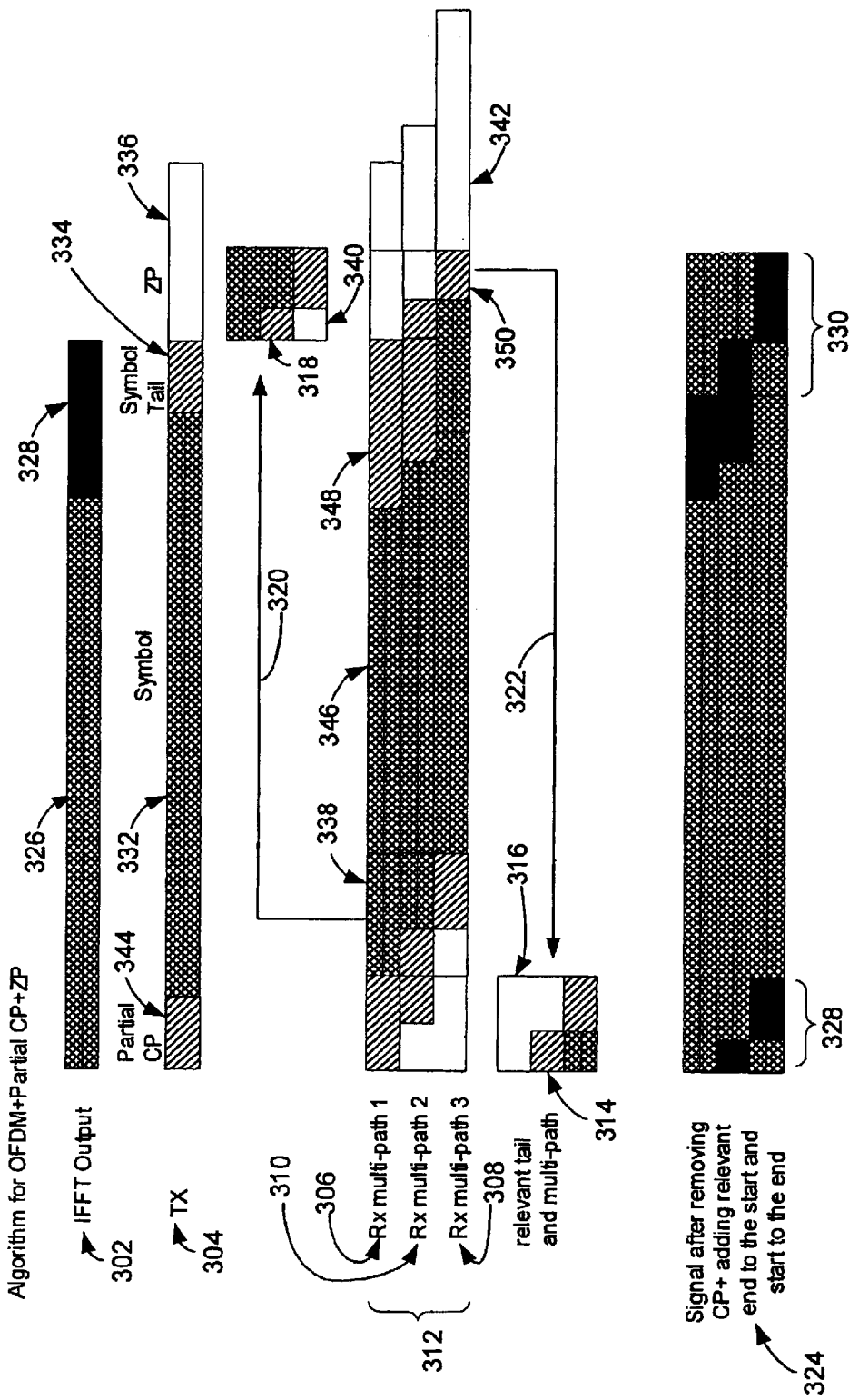

COMMUNICATION METHOD, SYSTEM, AND APPARATUS THAT COMBINES ASPECTS OF CYCLIC PREFIX AND ZERO PADDING TECHNIQUES

RELATED PRIORITY APPLICATION

This application claims priority to U.S. Provisional Application No. U.S. Provisional Application No. 60/450,737 filed on Feb. 28, 2003, which application is hereby incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

RELATED APPLICATIONS

This application is related to the following applications, all of which are hereby incorporated herein by reference in their entirety: U.S. Provisional Application No. 60/404,070, filed on Aug. 16, 2002; U.S. application Ser. No. 10/389,789 filed on Mar. 17, 2003; U.S. application Ser. No. 10/603,372, filed on Jun. 25, 2003; U.S. application Ser. No. 10/643,108, filed on Aug. 18, 2003, entitled, "System and Method for Multi-Band Ultra-wide Band Signal Generators"; and, U.S. application Ser. No. 10/642,886, entitled, "Scalable Ultra-Wide Band Communication System," filed on Aug. 14, 2003 all of which applications are hereby incorporated herein by reference in their entirety.

BACKGROUND OF THE INVENTION

This invention relates in general to communication methods, systems, and apparatuses, and in particular to communication methods, systems, and apparatuses utilizing aspects of cyclic prefix and zero padding techniques.

SUMMARY OF THE INVENTION

The present invention provides communication methods, systems, and apparatuses, including wired as well as wireless methods, systems, and apparatuses. In some embodiments, the invention provides methods, systems, and apparatuses for use with multi-carrier modulation techniques such as, for example, Orthogonal Frequency Division Multiplexing (OFDM) transmission, reception, or communication. In some embodiments, the invention provides methods, systems, and apparatuses for use with single carrier modulation techniques such as, for example, binary phase shift keying (BPSK) and quaternary phase shift keying (QPSK).

In some embodiments, methods, systems, and apparatuses of the invention can be used in ultra-wide band transmission, reception, or communication, as described in previously incorporated by reference applications including U.S. Provisional Application No. 60/404,070, U.S. Provisional Application No. 60/450,737, and U.S. application Ser. No. 10/389,789, as well as multi-band ultra-wide band transmission, reception, or communication as described in detail in previously incorporated by reference applications including U.S. application Ser. No. 10/643,108, filed on Aug. 14, 2003, entitled, "System and Method for Multi-Band Ultra-wide Band Signal Generators."

Additionally, in some embodiments, methods, systems, and apparatuses according to the invention can be used in transmission, reception, or communication utilizing burst symbol cycles. A burst symbol cycle transmission includes an ON period during which one or more symbols are transmitted, and an OFF period during which no signal is transmitted. Further details regarding burst symbol cycles and burst symbol cycle transmission can be found in applications including previously incorporated by reference application Ser. No. 10/389,789.

Still further, in some embodiments, methods, systems, and apparatuses according to the invention can be used in transmission, reception, or communication utilizing varying or fractional Pulse Repetition Frequency (PRF), as described in detail in previously incorporated by reference applications including U.S. application Ser. No. 10/642,886, entitled, "Scalable Ultra-Wide Band Communication System," filed on Aug. 18, 2003. Additionally, some embodiments of the present invention can be used in transmission, reception, and communication using any of various combinations of the above-mentioned techniques.

The present invention provides communication methods, systems, and apparatuses, including methods used with orthogonal frequency division multiplexing and other multi-carrier modulation techniques, as well as methods used with single carrier modulation techniques, including, for example, binary phase shift keying and quaternary phase shift keying.

In some embodiments, a second signal for transmission is obtained from a first signal. In obtaining the second signal, a value or values of an initial portion of the first signal are each multiplied by a number, and a value or values of a symbol tail portion of the first signal are each multiplied by a number, such that each corresponding pair of initial portion and symbol tail portion values are multiplied by a first number and a second number, respectively. For each corresponding pair of initial portion and symbol tail portion values, a sum of the first number and the second number is equal to one. Upon or after reception, a third signal is obtained from the received second signal and used in obtaining information. Obtaining each of an initial portion and a tail portion of the third signal includes adding together at least a portion of each of the initial portion and the tail portion of the second signal. In some embodiments, due to a multi-path effect, the second signal is received as a combination of several of the second signal, at least two of the several being staggered in time with respect to each other.

In some embodiments, a second signal for transmission is obtained by halving values of an initial portion and a tail portion of a first signal, and adding zeros following the tail portion. Upon or after reception, a third signal is obtained from the received second signal and used in obtaining information. Obtaining each of an initial portion and a tail portion of the third signal includes adding together at least a portion of each of the initial portion and the tail portion of the second signal. In some embodiments, due to a multi-path effect, the second signal is received as a combination of several of the second signal, at least two of the several being staggered in time with respect to each other.

In some embodiments, a second signal for transmission is obtained from a first signal. The second signal is obtained by halving the value of an initial portion of the first signal to obtain an initial portion of the second signal, halving the value of a tail portion of the first signal to obtain a tail portion of the second signal, and adding zeros following the tail portion of the second signal. The second signal is transmitted. Upon or after reception of the second signal, a third signal is obtained from the received second signal. Obtaining an initial portion of the third signal includes adding at least a portion of the initial portion of the second signal to at least a portion of the tail portion of the second signal. Obtaining a tail portion of the third signal includes adding at least a portion of the initial portion of the second signal to at least a portion of the tail portion of the second signal. At least a portion of the second signal is used in obtaining information.

In some embodiments, a second signal for transmission using OFDM is obtained from a first signal, the first signal being an Inverse Fast Fourier Transform output signal. The second signal is obtained by halving the value of an initial portion of the first signal to obtain an initial portion of the second signal, halving the value of a tail portion of the first signal to obtain a tail portion of the second signal, and adding zeros following the tail portion of the second signal. The second signal is transmitted. Due to a multi-path effect, the second signal is received as a combination of several of the second signal, at least two of the several being staggered in time with respect to each other. Upon or after reception of the combination, a third signal is formed from the combination. Obtaining an initial portion of the third signal includes adding at least a portion of the initial portion of the second signal to at least a portion of the tail portion of the second signal. Obtaining a tail portion of the third signal includes adding at least a portion of the initial portion of the second signal to at least a portion of the tail portion of the second signal. At least a portion of the second signal is processed by a receiver to obtain information.

Additional aspects of the present invention will be apparent in view of the description which follows.

BRIEF DESCRIPTION OF THE DRAWINGS

The invention is illustrated in the figures of the accompanying drawings which are meant to be exemplary and not limiting, in which like references are intended to refer to like or corresponding parts, and in which:

FIG. 1 is a timing diagram relating to an algorithm for a communication technique using Orthogonal Frequency Division Multiplexing and Cyclic Prefix;

FIG. 2 is a timing diagram relating to an algorithm for a communication method using Orthogonal Frequency Division Multiplexing and Zero Padding; and FIG. 3 is a timing diagram relating to an algorithm for a communication technique using Orthogonal Frequency Division Multiplexing and a combination of aspects of Cyclic Prefix and Zero Padding.

DETAILED DESCRIPTION OF THE PREFERRED EMBODIMENT

In the following description of the preferred embodiment, reference is made to the accompanying drawings that form a part hereof, and in which is shown by way of illustration a specific embodiment in which the invention may be practiced. It is to be understood that other embodiments may be utilized and structural changes may be made without departing from the scope of the present invention.

As discussed above, in some embodiments, the present invention is used with multi-carrier modulation techniques, such as, for example, orthogonal frequency division multiplexing (OFDM). In some embodiments, the present invention is used with single carrier modulation techniques such as, for example, binary phase shift keying and quaternary phase shift keying. Further more, as discussed above, in some embodiments, methods, systems, and apparatuses according to the invention can be used in transmission, reception, or communication including use of burst symbol cycles, ultra-wide band, multi-band ultra-wide band, or variable pulse repetition frequency (PRF), or a combination of two or more of the foregoing techniques.

In some embodiments, a second signal for transmission is obtained from a first signal. In obtaining the second signal, a value or values of an initial portion of the first signal are each multiplied by a number, and a value or values of a symbol tail portion of the first signal are each multiplied by a number, such that each corresponding pair of initial portion and symbol tail portion values are multiplied by a first number and a second number, respectively. For each corresponding pair of initial portion and symbol tail portion values, a sum of the first number and the second number is equal to one. Upon or after reception, a third signal is obtained from the received second signal and used in obtaining information. Obtaining each of an initial portion and a tail portion of the third signal includes adding together at least a portion of each of the initial portion and the tail portion of the second signal. In some embodiments, due to a multi-path effect, the second signal is received as a combination of several of the second signal, at least two of the several being staggered in time with respect to each other.

In some embodiments, a second signal for transmission is obtained by halving values of an initial portion and a tail portion of a first signal, and adding zeros following the tail portion. Upon or after reception, a third signal is obtained from the received second signal and used in obtaining information. Obtaining each of an initial portion and a tail portion of the third signal includes adding together at least a portion of each of the initial portion and the tail portion of the second signal. In some embodiments, due to a multi-path effect, the second signal is received as a combination of several of the second signal, at least two of the several being staggered in time with respect to each other.

In some embodiments, a second signal for transmission is obtained from a first signal. The second signal is obtained by halving the value of an initial portion of the first signal to obtain an initial portion of the second signal, halving the value of a tail portion of the first signal to obtain a tail portion of the second signal, and adding zeros following the tail portion of the second signal. The second signal is transmitted. Upon or after reception of the second signal, a third signal is obtained from the received second signal. Obtaining an initial portion of the third signal includes adding at least a portion of the initial portion of the second signal to at least a portion of the tail portion of the second signal. Obtaining a tail portion of the third signal includes adding at least a portion of the initial portion of the second signal to at least a portion of the tail portion of the second signal. At least a portion of the second signal is used in obtaining information.

In some embodiments, a second signal for transmission using OFDM is obtained from a first signal, the first signal being an inverse Fast Fourier Transform output signal. The second signal is obtained by halving the value of an initial portion of the first signal to obtain an initial portion of the second signal, halving the value of a tail portion of the first signal to obtain a tail portion of the second signal, and adding zeros following the tail portion of the second signal. The second signal is transmitted. Due to a multi-path effect, the second signal is received as a combination of several of the second signal, at least two of the several being staggered in time with respect to each other. Upon or after reception of the combination, a third signal is formed from the combination. Obtaining an initial portion of the third signal includes adding at least a portion of the initial portion of the second signal to at least a portion of the tail portion of the second signal. Obtaining a tail portion of the third signal includes adding at least a portion of the initial portion of the second signal to at least a portion of the tail portion of the second signal. At least a portion of the second signal is processed by a receiver to obtain information.

FIG. 1 is a timing diagram relating to an algorithm 100 for a communication technique using Orthogonal Frequency Division Multiplexing and Cyclic Prefix. An output signal 102 is obtained using an Inverse Fast Fourier Transform (IFFT), the output signal 102 including a symbol portion 116 and a symbol tail portion 118. A transmission signal 104 is obtained from the output signal 102, and includes a symbol portion 122 and a symbol tail portion 124. The symbol portions 116, 122 are identical.

In obtaining the transmission signal 104, the symbol tail of the output signal 102 is copied to form the initial cyclic prefix portion of the transmission signal 104. For example, in some embodiments, the output signal 118 may be a sequence including 128 samples. The tail 118 may be 32 samples long. The transmission signal 104 may be a sequence 160 samples long, with an initial cyclic prefix portion 120 of 32 samples, followed by the symbol 116 of 120 samples, followed by the symbol tail portion 118 of 32 samples. The symbol tail portion 118 contains identical information as the initial portion 120.

The transmission signal 104 is transmitted. Due to multi-path effects, the transmission signal 104 is received as a multi-path signal 112 that is a sum of several added signal components 106, 108, 110 which are depicted separately but are actually components of the single received multi-path signal 112. The multi-path signal 112 includes a set of initial portions 126, a set of symbol portions 128, and a set of symbol tail portions 130. After or upon reception, a third signal 114 is obtained from the received multi-path signal 112. To obtain the third signal 114, cyclic prefix removal is performed on the multi-path signal 112. The cyclic prefix removal includes removing at least a portion of the initial portion 126 of the multi-path signal, or a portion of the tail portion 130 of the multi-path signal, or both, leaving a valid portion, which is a portion that must include a complete symbol portion of the multi-band signal 112, in the third signal 114, to be processed by the receiver to obtain information. It can be possible to turn a receiver off, reducing power consumption, for a time corresponding to the removed portion or use it for purposes of frequency switching, DC mitigation or filtering.

FIG. 2 is a timing diagram relating to an algorithm 200 for a communication method using Orthogonal Frequency Division Multiplexing and Zero Padding. An output signal 202 is obtained using an IFFT, the output signal 202 including a symbol portion 224 and a symbol tail portion 226. A transmission signal 204 is obtained from the output signal 202, and includes a symbol portion 228, a symbol tail portion 226 and a zero padding portion 232 that is added following the tail portion 230, the zero padding portion contains only zeros or holes.

The transmission signal 204 is transmitted. Due to multi-path effects, the transmission signal 104 is received as a multi-path signal 212 that is a sum of several added signal components 206, 208, 210 which are depicted separately but are actually components of the single received multi-path signal 212. The multi-path signal 212 includes a set of initial portions 214, a set of symbol portions 238, a set of symbol tail portions 222, and a set of zero portions 236. As depicted, the initial portions 214 and the symbol tail portion 234 contain zeros as well as of the symbol portions. After or upon reception, a third signal 114 is obtained from the received multi-path signal 112. As conceptually depicted by arrows 240, 242, an initial portion 248 of the third signal is obtaining by adding together a value or values of the initial portion 214 of the multi-path signal 212 and a value or values of the symbol tail portion 234 of the multi-path signal 212, and a symbol tail portion 250 is obtaining by adding together the value or values of the initial portion 214 of the multi-path signal 212 and the value or values of the symbol tail portion 234 of the multi-path signal 212. In some embodiments, the foregoing additions are performed simultaneously. The zero portion 236 of the multi-path signal 212 is dropped or not utilized. The third signal 252 includes a valid portion 134 to be processed by the receiver to obtain information. In some embodiments, a receiver can be turned off, reducing power consumption, for a time corresponding to the removed portion or use it for purposes of frequency switching, DC mitigation or filtering.

FIG. 3 is a timing diagram relating to an algorithm 300 for a communication technique using Orthogonal Frequency Division Multiplexing and a combination of aspects of Cyclic Prefix and Zero Padding. An output signal 302 is obtained using an IFFT, the output signal 302 including a symbol portion 326 and a symbol tail portion 328. A transmission signal 304 is obtained from the output signal 302, and includes an initial portion 344, or what can be viewed in some regards as a partial cyclic prefix portion, a symbol portion 332, a symbol tail portion 334, and a zeros portion 336, or what can be viewed in some regards as a zero padding portion. The symbol tail portion 334 contains identical information as the initial portion 344. In obtaining the transmission signal 304, the symbol tail 328 of the output signal 302 is copied to form the initial portion 344 of the transmission signal 304. It is to be understood that although the terms "cyclic prefix" and "zero padding" are used with reference to the embodiment depicted in FIG. 3, these terms only convey that aspects of the embodiment depicted in FIG. 3 are similar in some regards to aspects of cyclic prefix or zero padding techniques, and does not mean that the embodiment depicted in FIG. 3 is identifiable as either a cyclic prefix technique or a zero padding technique.

As depicted in FIG. 3, the initial portion 344 of the transmission signal 304 is obtained by halving, or dividing by two, the value or values of an initial portion of the symbol portion 326 of the output signal 302, and the symbol tail portion 334 of the transmission signal 304 is obtained by halving, or dividing by two, the symbol tail portion 328 of the output signal 302. However, in other embodiments, various different mathematical operations can be performed and still lead to successful implementation.

Generally, any mathematical operations performed on initial portion and tail portion values will lead to successful implementation provided such operations can be described according to the following formulation. In the following formulation, corresponding values in an initial portion and a symbol tail portion refers to values such as sample values that correspond sequentially or positionally with respect to an initial portion and a symbol tail portion in which the values are included. For example, in FIG. 3, a first value appearing in the initial portion 338 for Rx multi-path 1 and a first value appearing in the symbol tail portion 350 for Rx multi-path 2 would be a corresponding pair. The formulation, stated in relation to the embodiment depicted in FIG. 3, is that, in obtaining the transmission signal 304, a value or values of an initial portion of the output signal 302 are each multiplied by a number, and a value or values of a symbol tail portion 328 of the output signal 302 are each multiplied by a number, such that each corresponding pair of initial portion and symbol tail portion values are multiplied by a first number and a second number, respectively. For each corresponding pair of initial portion and symbol tail portion values, a sum of the first number and the second number is equal to one. It is to be understood that halving corresponding values is one particular case that meets the foregoing formulation. It is further to be understood that the foregoing rule is formulated in terms of multiplication, equivalent mathematical operations or operations that produce equivalent results are intended to be included. For example, division by two and multiplication by one half are intended to be considered equivalent, and to both meet the formulation.

The symbol portion 332 of the transmission signal 304 is identical to the symbol portion 326 of the output signal 302.

The transmission signal 304 is transmitted. Due to multi-path effects, the transmission signal 304 is received as a multi-path signal 312 that is a sum of several added signal components 306, 308, 310, which are depicted separately but are actually components of the single received multi-path signal 312. The multi-path signal 312 includes a set of initial portions 338, a set of symbol portions 346, a set of symbol tail portions 350, and a set of zero portions 324.

After or upon reception, a third signal 324 is obtained from the received multi-path signal 312. As conceptually depicted by arrows 320, 322, an initial portion 328 of the third signal 324 is obtained by adding together a value or values of at least a portion of the initial portion 338 of the multi-path signal 312 and a value or values of at least a portion of the symbol tail portion 350 of the multi-band signal, and a symbol tail portion of the third signal 324 is obtained by adding together the value or values of at least a portion of the initial portion 338 of the multi-path signal 312 and the value or values of at least a portion of the symbol tail portion 350 of the multi-band signal (an overlap and add technique). In some embodiments, the foregoing additions are performed simultaneously. The described overlap and add technique can provide an advantage in providing flexibility with regard to selection of a valid portion of a signal. The zero padding portion 342 of the multi-path signal 312 is dropped or not utilized.

In some embodiments, a receiver can be turned off, reducing power consumption, for a time corresponding to the removed portion or use it for purposes of frequency switching, DC mitigation or filtering.

The technique depicted with reference to FIG. 3 is flexible in that the initial portion 338 and symbol tail portion 350 can be of any of several different lengths up to the full length that would be utilized in a cyclic prefix technique. Additionally and correspondingly, the zero padding portion 342 can be of any of several lengths up to a full length that would be utilized in a zero padding technique. Generally, in the technique depicted with reference to FIG. 3, a length of a cyclic prefix portion plus a zero padding portion can be the length of a full length of a zero padding portion in a zero padding technique, or a full length of a cyclic prefix portion in a cyclic prefix technique. The lengths can be set according to system or application requirements, can be fixed, or determined according to varying requirements by an algorithm, computer program, or otherwise.

As such, the technique depicted with reference to FIG. 3 allows a trade off or adaptive trade-off and flexible compromise between advantages and disadvantages of cyclic prefix techniques and zero padding techniques. Generally, cyclic prefix provides advantages with regard to implementation and Narrow band interference mitigation, while zero padding provides advantages with regard to performance, signal flatness and selective fading mitigation, especially when channel length is long. By using the technique described with reference to FIG. 3, a flexible trade-off between the advantages of pure cyclic prefix and pure zero padding can be achieved. Additionally, advantages unique to the inventive techniques are obtained.

As such, the technique described with reference to FIG. 3 has advantages over cyclic prefix and zero padding techniques in that it allows selection, such as adaptive selection, for a given required or selected cyclic prefix and/or zero padding signal portion length, how much is to be cyclic prefix-type and how much is to be zero padding. Furthermore, the technique depicted with reference to FIG. 3 is generally better than pure zero padding techniques in terms of implementation, mitigation of ICI due to timing error or frequency error and Narrow band interference mitigation and generally better than cyclic prefix in terms of performance, selective fading mitigation and providing signal flatness.

In particular, cyclic prefix techniques can be preferable from an implementation perspective, such as by allowing reduced requirements with respect to such system components or aspects as filters, DC mitigation, frequency switching and an ability to not receive a cyclic prefix portion of a signal (such as by having the receiver turned off for a period corresponding to such a cyclic prefix portion). However, zero padding has advantages including improved performance, selective fading mitigation and increased signal flatness as compared with cyclic prefix.

Generally, it is often preferable to use only a needed length of cyclic prefix, according to system requirements, application requirements, or environmental requirements. Pure Zero padding and cyclic prefix techniques do not allow such flexibility, while the technique depicted with reference to FIG. 3 does allow such flexibility. For example, a cyclic prefix portion in the technique depicted with reference to FIG. 3 can be decided upon or determined based on a channel length that it is desired or necessary to cover or protect.

A further measure of an advantage of cyclic prefix can be achieved in that, to an extent that cyclic prefix type technique including an overlap and add technique is utilized in embodiments of the inventive method, inter-carrier interference (ICI) resulting from timing error or frequency error can be reduced. Additionally, a measure of an advantage of zero padding can be achieved in that, to an extent that zero padding type technique is utilized in embodiments of the inventive method, techniques can be employed to allow recovery from selective fading in a similar fashion to the manner in which that advantage can be obtained when a pure zero padding technique is being employed.

Additionally, the technique depicted with reference to FIG. 3 can be used effectively with variable PRF techniques such as those described in previously incorporated by reference U.S. application Ser. No. 10/642,886, entitled, "Scalable Ultra-Wide Band Communication System," filed on Aug. 18, 2003. In particular, in fractional PRF techniques, such a ½ or ⅓ PRF techniques, zeros or zero time are effectively available in addition to a zero portion of a signal, as a result of the quiet time between pulses, and the technique depicted with reference to FIG. 3 allows such zeros to be taken advantage of in addition to a zero portion of a signal as described herein, thus allowing better protection against long channel response.

What is claimed is:

1. A method for communicating information, the method comprising:

obtaining a first signal;

obtaining a second signal, comprising multiplying each of a value or values of an initial portion of the first signal by a number, and multiplying each of a value or values of a symbol tail portion of the first signal by a number, such that each corresponding pair of initial portion and symbol tail portion values are multiplied by a first number and a second number, respectively, and wherein, for each corresponding pair of initial portion and symbol tail portion values, a sum of the first number and the second number is equal to one; and upon or after reception of the second signal, obtaining a third signal from the received second signal, the third signal being used in obtaining information, wherein obtaining each of an initial portion and a tail portion of the third signal comprises adding together at least a portion of each of an initial portion and a symbol tail portion of the second signal.

2. The method of claim 1, comprising, due to a multi-path effect, receiving the second signal as a combination of several of the second signal, at least two of the several being staggered in time with respect to each other.

3. A method for communicating information, the method comprising:

obtaining a first signal;

obtaining a second signal by halving values of an initial portion and a tail portion of the first signal, and adding zeros following the tail portion; and upon or after reception of the second signal, obtaining a third signal from the received second signal, the third signal being used in obtaining information, wherein obtaining each of an initial portion and a tail portion of the third signal comprises adding together at least a portion of each of an initial portion and a tail portion of the second signal.

4. The method of claim 3, comprising, due to a multi-path effect, receiving the second signal as a combination of several of the second signal, at least two of the several being staggered in time with respect to each other.

5. A method for communicating information, the method comprising:

obtaining a first signal that comprises an Inverse Fast Fourier Transform output signal;

obtaining a second signal for transmission using OFDM, by halving values of an initial portion and a tail portion of the first signal, and adding zeros following the tail portion;

upon or after reception of the second signal, obtaining a third signal from the received second signal, wherein obtaining each of an initial portion and a tail portion of the third signal comprises adding together at least a portion of each of an initial portion and a tail portion of the second signal; and processing at least a portion of the third signal to obtain information.

6. The method of claim 5, comprising, due to a multi-path effect, receiving the second signal as a combination of several of the second signal, at least two of the several being staggered in time with respect to each other.

* * * * *